UNITED STATES PATENT OFFICE.

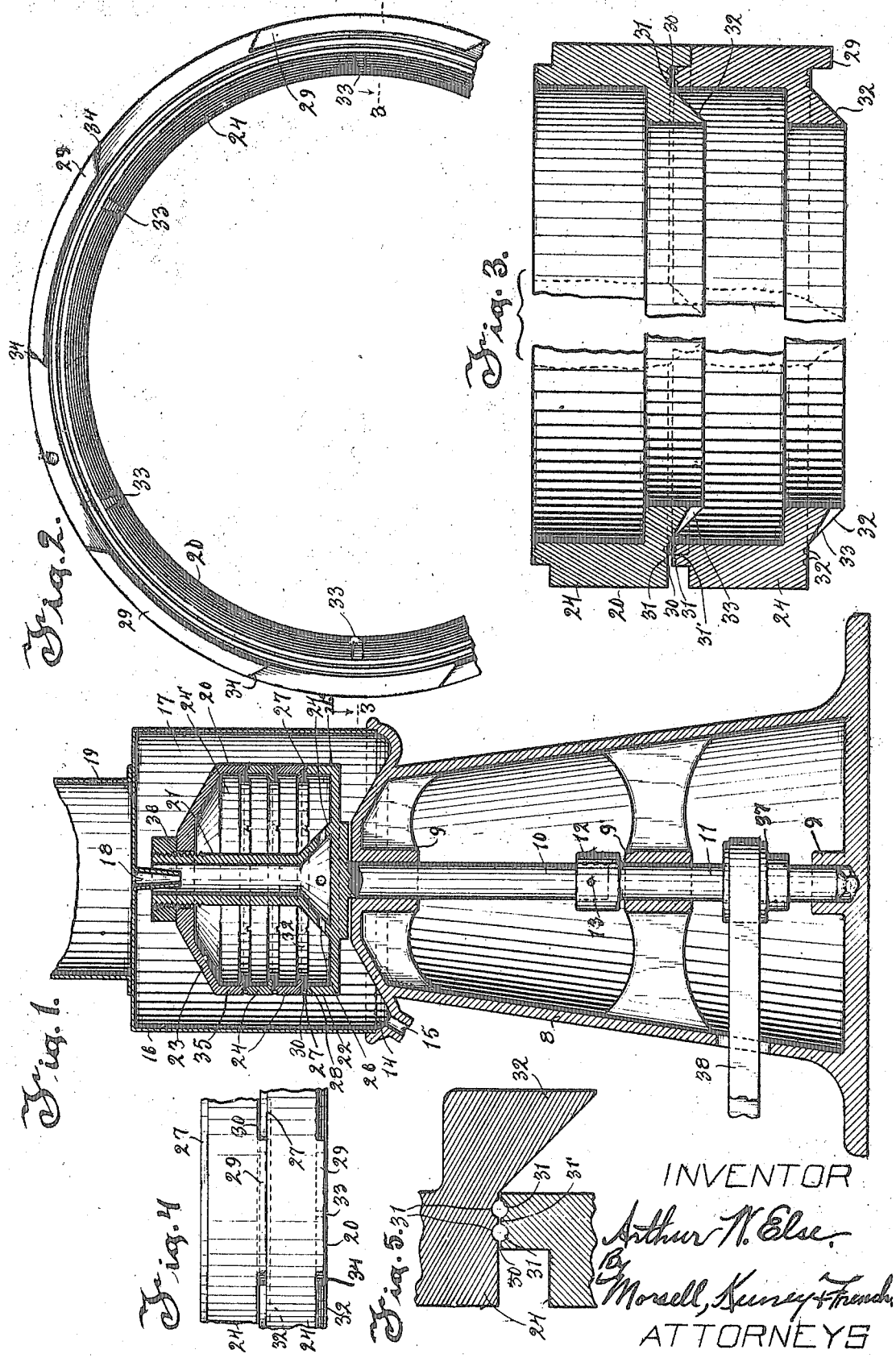

ARTHUR W. ELSE, OF JANESVILLE, WISCONSIN, ASSIGNOR TO MARIE E. ELSE, OF MILWAUKEE, WISCONSIN.

EMULSIFYING-MACHINE.

1,249,358.      Specification of Letters Patent.      Patented Dec. 11, 1917.

Application filed April 24, 1916. Serial No. 93,089.

*To all whom it may concern:*

Be it known that I, ARTHUR W. ELSE, a citizen of the United States, and resident of Janesville, in the county of Rock and State of Wisconsin, have invented new and useful Improvements in Emulsifying-Machines, of which the following is a description, reference being had to the accompanying drawings, which are a part of this specification.

This invention relates to improvements in emulsifying machines.

It is one of the objects of the present invention to provide an emulsifying machine for producing cream from an emulsion of butter with milk, skimmed milk, condensed milk or powdered milk by reassembling the component parts of the milk and butter in such a manner as to have all of the properties and appearances of fresh cream.

A further object of the invention is to provide an emulsifying machine in which the emulsification is effected by forcing the ingredients through very fine crevices by means of centrifugal force and thus break up the fat globules of the butter and evenly distribute them through the milk serum.

A further object of the invention is to provide an emulsifying machine in which a plurality of ring like members placed one above and slightly spaced from each other by projecting shoulders permit the discharge therethrough by centrifugal force of the ingredients poured into the chamber formed by the ring like members.

A further object of the invention is to provide an emulsifying machine in which the ring like members are so formed and positioned as to permit the ingredients being emulsified to freely pass upwardly from one ring member to the other in the event that the capacity of the interspaces of the lower ring members are overtaxed or stopped up.

A further object of the invention is to provide an emulsifying machine in which portions of the ring members forming the discharge orifices are provided with radial and annular grooves to supply the orifices with ingredients and to change the direction of the flow and more completely break up the butter globules in passing between the rings.

A further object of the invention is to provide an emulsifying machine which may be easily separated and reassembled for cleaning purposes, and which is of very simple construction and inexpensive to manufacture.

With the above and other objects in view the invention consists of the improved emulsifying machine and its parts and combinations as set forth in the claims, and all equivalents thereof.

In the accompanying drawing in which the same reference characters indicate the same parts in all of the views—

Figure 1 is a vertical central sectional view of the improved emulsifying machine;

Fig. 2 is an inverted view, on a larger scale, of a portion of one of the ring members removed from the machine;

Fig. 3 is a vertical sectional view of two of the ring members taken on line 3—3 of Fig. 2;

Fig. 4 is a detail view of two of the ring members; and

Fig. 5 is a transverse sectional detail view on a larger scale of two of the ring members.

Referring to the drawing the numeral 8 indicates the tubular frame or standard of the improved emulsifying machine which is formed with bearings 9 and 9' to hold a vertically extending emulsor shaft 10 and a drive shaft 11 forming an extension thereof and upon which the emulsor shaft is supported and turns therewith. The upper end portion of the drive shaft is formed with a cup 12 to receive the lower end of the emulsor shaft 10. A pin 13 removably connects the two shafts together. The upper end portion of the standard is formed with an annular trough 14 provided with a discharge opening 15, and a casing 16 resting upon the trough portion forms an inclosure 17 within which the ingredients are emulsified. A downwardly extending feed nozzle 18 and an upward extension 19 is formed on the casing to charge the emulsor 20, mounted within the chamber, with the ingredients.

The emulsor is mounted on and forms part of the upper end portion of the emulsor shaft and comprises the tubular charging portion 21 provided with a flanged base portion 22, the flanged top portion 23 and the intermediate emulsor ring members 24 all of said parts forming an emulsion chamber 24'.

The tubular portion 21 is in vertical alinement with the feed nozzle 18 and at its lower end adjacent the base portion is of conical form as indicated by the numeral 25 and is provided with a plurality of discharge openings 26 through which ingredients flow. The base portion 22 projects laterally outwardly from the emulsor shaft and is provided with an upturned annular flange 26' similar in all respects to one of the ring members. The outer half portion of the upper edge of the annular flange is cut away or rabbeted as indicated by the numeral 27 to permit the overlapping of the remaining upstanding inner portion 28 by the downwardly projecting segmental spacing extensions 29 formed on the lower edge of the lower ring member 24 resting thereon. The said extensions 29 are of greater depth than the rabbeted portion 27 to form spaces or crevices 30 of approximately 1/5000 of an inch between the upper and lower annular edges of the ring member and the upturned annular flange.

By positioning the spacing extensions adjacent the spaces or crevices a more exact spacing of the parts may be accomplished, in a simple manner by facing off the surfaces of the extensions to the desired extent, than could be accomplished in other forms of emulsors in which the members are in the form of flanged disks having spacing hubs, as any slight angularity of the face of the hubs will greatly change the width of the spaces adjacent the peripheries of the disks.

The adjacent edges of the parts are provided with annular grooves 31 which divide the edge portions into a plurality of partitions 31' and serve to change the direction of the flow of the ingredients discharged through the spaces or crevices therebetween and more completely break up the globules of butter and emulsify the ingredients. The grooves and partitions are equivalent to a plurality of separate chambers and partitions therebetween and the globules passing therebetween are more completely broken up into finer particles.

The lower portion of the ring member is provided with a downwardly and inwardly extending annular guide flange 32 having an outwardly and upwardly inclined face 33 for directing the flow of the ingredients through the discharge spaces or crevices 30. The guide flange 32 is also provided with radial or transverse grooves 33 for also directing the flow of the ingredients to the discharge spaces.

The end portions 34 are angled tangentially with relation to the direction of rotation and flow of discharging material to expedite the passage of the ingredients through the spaces.

As all of the ring members are of the same construction and likewise the lower edge portion of the flange 35 of the cap 23 the same reference numerals will apply.

A nut 36 threaded on the upper end of the tubular portion of the emulsor shaft and bearing on the cap member serves to clamp all of said parts firmly together.

The drive shaft 11 is provided with a pulley 37 and is driven by a belt 38 which is connected to a suitable source of power.

In operation unsalted butter in a melted state, milk, skimmed milk or milk powder and water are poured into the casing extension and from which casing the ingredients will flow into the tubular portion of the emulsor shaft and into the emulsion chamber. The emulsor shaft is rotated at a high rate of speed, approximately 12000 R. P. M., and the ingredients will by centrifugal force be forced against the inner face of the outer wall of the emulsion chamber and to pass out through the spaces or crevices between the ring members and the cap and base portions of the emulsor.

The fluid ingredients in engaging the inner face of said outer wall will, in the event that the lower space is not of sufficient capacity to take care of the column of feed, flow upwardly to the next or to all of the spaces until the capacity of the machine is reached. The same result will be produced in the event that the lower spaces become clogged.

The upwardly and outwardly inclined surfaces of the annular flanges of the ring member will tend to direct the fluid toward the discharge spaces and the annular grooves and partitions formed in the members tend to change the direction of flow of the fluid and break up into smaller particles, the fat globules of the butter and to more completely mix them with the other ingredients.

By removing the casing and unscrewing the nut the parts may be easily separated and cleaned.

From the foregoing description it will be seen that the emulsifying machine is of very simple construction and that by means of the spacing extensions the ring members may be easily and accurately spaced.

What I claim as my invention is:

1. An emulsifying machine, comprising a support, a shaft journaled therein, an emulsifying chamber carried by the shaft and formed in part of ring members provided with segmental spacing extensions and rabbeted portions adjacent their peripheral portions for spacing the ring members apart to form discharge crevices therebetween, and means for locking the ring members on the shaft.

2. An emulsifying machine, comprising a support, a shaft journaled therein, an emulsifying chamber carrier by the shaft and formed in part of ring members provided with segmental spacing extensions and rabbeted portions adjacent their peripheral portions which overlap rabbeted portions of adjacent ring members for spacing the ring members to form discharge crevices therebetween, and means for locking the ring members on the shaft.

3. An emulsifying machine, comprising a support, a shaft journaled therein, an emulsifying chamber carried by the shaft and formed in part of ring members provided with segmental spacing extensions adjacent their peripheral portions which overlap projecting portions of adjacent ring members for spacing the ring members apart to form discharge crevices therebetween and also having annular grooves formed in adjacent edge portions of the said members, and means for locking the ring members on the shaft.

4. An emulsifying machine, comprising a support, a shaft journaled therein, an emulsifying chamber carried by the shaft and formed in part of ring members provided with segmental spacing extensions adjacent their peripheral portions which overlap projecting portions of adjacent ring members for spacing the ring members to form discharge crevices therebetween and also having annular grooves formed in adjacent edge portions of the said members, and means for locking the ring members on the shaft.

5. An emulsifying machine, comprising a support, a vertical shaft journaled therein, an emulsifying chamber carried by the shaft and formed in part of ring members provided with spacing extensions which overlap and rest upon adjacent members to form discharge crevices therebetween, and means for locking said ring members on the shaft.

6. An emulsifying machine, comprising a support, a vertical shaft journaled therein and having an upper tubular portion, a plurality of ring members mounted on the shaft and surrounding the tubular portion, said ring members forming in part an emulsion chamber and provided with segmental spacing extensions adjacent their peripheries which engage adjacent ring members and space the ring members apart to form discharge crevices therebetween, and means for locking said ring members on the shaft.

7. An emulsifying machine, comprising a support, a vertical shaft journaled therein and having a tubular portion and a base portion, a cap member surrounding the upper portion of the tubular part of the shaft, a ring member interposed between the base member and the cap member, some of said members having vertically projecting segmental spacing extensions near their peripheries which engage rabbeted portions of the adjacent members to form spacing crevices therebetween, and a nut having a threaded engagement with the tubular portion of the shaft for locking said members together.

8. An emulsifying machine, comprising a support, a vertical shaft journaled therein and having an upper tubular portion with side openings and a base portion, a cap member surrounding the upper portion of the tubular part of the shaft, a ring member interposed between the base member and the cap member, some of said members having projecting spacing extensions near their peripheries which engage the adjacent members to form discharge crevices therebetween, some of said members also having inwardly extending annular flanges with inclined faces for directing fluid through the crevices, and a nut having a threaded engagement with the tubular portion of the shaft for locking said members together.

9. An emulsifying machine, comprising a support, a vertical shaft journaled therein and having an upper tubular portion with side openings and a base portion, a cap member surrounding the upper portion of the tubular part of the shaft, a ring member interposed between the base member and the cap member, some of said members having projecting spacing extensions near their peripheries which engage the adjacent members to form discharge crevices therebetween and also having circumferentially extending grooves in their adjacent edges, some of said members also having inwardly extending annular flanges with inclined faces for directing fluid through the crevices, and a nut having a threaded engagement with the tubular portion of the shaft for locking said members together.

10. An emulsifying machine, comprising a support, a vertical shaft journaled therein and having an upper tubular portion with side openings and a base portion, a cap member surrounding the upper portion of the tubular part of the shaft, a plurality of ring members interposed between the base portion and the cap member, some of said members having downwardly projecting segmental spacing extensions adjacent their peripheries which engage adjacent members and space the members apart and form discharge crevices therebetween, some of said members also having inwardly extending annular flanges with inclined faces for directing fluid through the crevices, and a nut having a threaded engagement with the tubular portion of the shaft for locking said members together.

In testimony whereof, I affix my signature.

ARTHUR W. ELSE.